United States Patent
Hassan et al.

(10) Patent No.: US 9,669,381 B2
(45) Date of Patent: Jun. 6, 2017

(54) SYSTEM AND PROCESS FOR HYDROCRACKING

(75) Inventors: Abbas Hassan, Sugar Land, TX (US); Ebrahim Bagherzadeh, Sugar Land, TX (US); Rayford G. Anthony, College Station, TX (US); Gregory Borsinger, Chatham, NJ (US); Aziz Hassan, Sugar Land, TX (US)

(73) Assignee: HRD Corporation, Houston, TX (US)

( * ) Notice: Subject to any disclaimer, the term of this patent is extended or adjusted under 35 U.S.C. 154(b) by 1133 days.

(21) Appl. No.: 12/138,234

(22) Filed: Jun. 12, 2008

(65) Prior Publication Data

US 2009/0000986 A1   Jan. 1, 2009

Related U.S. Application Data (60) Provisional application No. 60/946,449, filed on Jun. 27, 2007, provisional application No. 60/946,452, filed on Jun. 27, 2007.

(51) Int. Cl.
  *C10G 47/00* (2006.01)
  *B01J 19/18* (2006.01)
  (Continued)

(52) U.S. Cl.
  CPC ....... *B01J 19/1806* (2013.01); *B01F 7/00766* (2013.01); *B01F 13/1013* (2013.01);
  (Continued)

(58) Field of Classification Search
  CPC ........ C10G 47/00; C10G 47/02; C10G 47/04; C10G 47/12; C10G 47/16; C10G 2300/40
  (Continued)

(56) References Cited

U.S. PATENT DOCUMENTS

| | | |
|---|---|---|
| 2,520,424 A | 8/1950 | Mills et al. |
| 3,147,206 A * | 9/1964 | Tulleners ............... 208/111.1 |

(Continued)

FOREIGN PATENT DOCUMENTS

| | | |
|---|---|---|
| EA | 017142 | 10/2012 |
| GB | 887794 | 1/1962 |

(Continued)

OTHER PUBLICATIONS

Mixer profile, me-003, ross x-series mixer emulsifiers, accessed from www.mixers.com on Jun. 12, 2015.*

(Continued)

*Primary Examiner* — Michelle Stein
(74) *Attorney, Agent, or Firm* — Timothy S. Westby; Porter Hedges LLP (57) ABSTRACT

A method for hydrocracking a feedstream comprising liquid hydrocarbon by forming a dispersion comprising hydrogen-containing gas bubbles dispersed in the liquid hydrocarbon, wherein the bubbles have a mean diameter of less than about 5 μm, and introducing the dispersion into a hydrocracker comprising hydrocracking catalyst. A method for hydrocracking by subjecting a fluid mixture comprising hydrogen-containing gas and liquid hydrocarbons to a shear rate greater than 20,000 $s^{-1}$ to produce a dispersion of hydrogen in a continuous phase of the liquid hydrocarbons, and introducing the dispersion into a fixed bed hydrocracking reactor from which a hydrocracked product is removed. A system for hydrocracking a hydrocarbonaceous feedstream including at least one high shear device capable of producing a tip speed of the at least one rotor of greater than 5.0 m/s, and a hydrocracker containing hydrocracking catalyst and comprising an inlet fluidly connected to an outlet of the high shear device.

21 Claims, 2 Drawing Sheets

(51) Int. Cl.
*B01F 7/00* (2006.01)
*B01F 13/10* (2006.01)
*B01J 8/02* (2006.01)
*B01J 8/20* (2006.01)
*B01J 19/00* (2006.01)

(52) U.S. Cl.
CPC ........... *B01F 13/1016* (2013.01); *B01J 8/025* (2013.01); *B01J 8/20* (2013.01); *B01J 19/0066* (2013.01); *C10G 47/00* (2013.01); *B01J 2219/00006* (2013.01); *B01J 2219/00779* (2013.01); *C10G 2300/107* (2013.01); *C10G 2300/1074* (2013.01); *C10G 2300/1077* (2013.01); *C10G 2300/4081* (2013.01)

(58) Field of Classification Search
USPC ........................................... 208/107–112, 46
See application file for complete search history.

(56) References Cited

U.S. PATENT DOCUMENTS

| | | | |
|---|---|---|---|
| 3,523,887 | A | 8/1970 | Hanson et al. |
| 3,884,798 | A | 5/1975 | Hilfman |
| 3,887,167 | A | 6/1975 | Irwin |
| 3,996,012 | A | 12/1976 | Zucker |
| 4,108,682 | A | 8/1978 | Takeda et al. |
| 4,434,049 | A * | 2/1984 | Dean et al. ............ 208/113 |
| 4,861,459 | A * | 8/1989 | Cetinkaya .............. 208/113 |
| 4,882,035 | A * | 11/1989 | Loutaty et al. .......... 208/45 |
| 4,973,430 | A | 11/1990 | Rivers, Jr. |
| 5,133,941 | A | 7/1992 | Hays et al. |
| 5,391,287 | A | 2/1995 | Nakagawa |
| 5,538,191 | A | 7/1996 | Holl |
| 5,632,596 | A * | 5/1997 | Ross .................... 415/83 |
| 5,877,350 | A | 3/1999 | Langer et al. |
| 6,241,472 | B1 * | 6/2001 | Bosch et al. ........... 415/208.3 |
| 6,251,263 | B1 | 6/2001 | Hatanaka et al. |
| 6,368,366 | B1 | 4/2002 | Langer et al. |
| 6,368,367 | B1 | 4/2002 | Langer et al. |
| 6,383,237 | B1 | 5/2002 | Langer et al. |
| 6,413,413 | B1 | 7/2002 | Smith, Jr. et al. |
| 6,517,706 | B1 | 2/2003 | Pruden et al. |
| 6,530,964 | B2 | 3/2003 | Langer et al. |
| 6,742,774 | B2 | 6/2004 | Holl |
| 6,881,326 | B2 | 4/2005 | Ackerson et al. |
| 7,008,595 | B2 | 3/2006 | Pankaj et al. |
| 8,371,741 | B2 | 2/2013 | Hassan et al. |
| 2002/0116868 | A1 * | 8/2002 | Westfall et al. ........ 44/301 |
| 2003/0043690 | A1 | 3/2003 | Holl |
| 2003/0084658 | A1 | 5/2003 | Brown et al. |
| 2003/0223924 | A1 * | 12/2003 | Bachtel ......... B01J 8/0453 208/108 |
| 2003/0225306 | A1 | 12/2003 | Boelt et al. |
| 2004/0052158 | A1 | 3/2004 | Holl |
| 2005/0033069 | A1 * | 2/2005 | Holl et al. ............ 554/141 |
| 2005/0234281 | A1 | 10/2005 | Bjorklund et al. |
| 2005/0241992 | A1 | 11/2005 | Lott et al. |
| 2006/0054534 | A1 | 3/2006 | Chen et al. |
| 2006/0102519 | A1 * | 5/2006 | Tonkovich et al. ......... 208/107 |
| 2006/0116544 | A1 | 6/2006 | Wakui et al. |
| 2006/0245991 | A1 | 11/2006 | Holl |
| 2006/0254956 | A1 * | 11/2006 | Khan ...................... 208/209 |
| 2007/0030322 | A1 | 2/2007 | Lee et al. |
| 2007/0138061 | A1 | 6/2007 | Costinel |

FOREIGN PATENT DOCUMENTS

| | | |
|---|---|---|
| ID | 0025983 | 6/2010 |
| JP | 495104 | 1/1974 |
| JP | 63296830 | 12/1988 |
| MX | 281005 | 11/2010 |
| MX | 296394 | 2/2012 |
| WO | 0018854 | 4/2000 |
| WO | 02/064708 | 8/2002 |
| WO | 2006122275 | 5/2005 |
| WO | 2005104786 | 11/2005 |
| WO | 2006122275 | 11/2006 |
| WO | 2009002962 | 12/2008 |

OTHER PUBLICATIONS

Gary, J. H. et al. (2007). Petroleum Refining Technology and Economics, 5th ed., Taylor & Francis, p. 322.
Speight, J. G. (1999). The Chemistry and Technology of Petroleum, Marcel-Dekker, p. 609.
Fahim, M. A. et al. (1991). Ind. Eng. Chem. Res., 30, pp. 255-259.
Korean Office Action dated Mar. 14, 2011; Serial No. 10-2009-7017030, English Translation (4 pages).
European Search Report dated Apr. 21, 2011; Serial No. 08771785.6 (5 pages).
European Search Report dated Aug. 5, 2011; Serial No. 08771783.1 (12 pages).
Gogate et al., "Cavitation: A technology on the Horizon," Current Science 91 (No. 1): 35-46 (2006).
Chinese Office Action dated Jul. 13, 2011, Chinese Application No. 200880003123.3, 6 pages.
Office Action dated Dec. 29, 2011 issued in corresponding Korean Application No. 10-2009-7017030 & English Summary (4 pgs.).
Office Action dated Jun. 25, 2009 for U.S. Appl. No. 12/142,447.
Office Action dated Jan. 7, 2010 for U.S. Appl. No. 12/142,447.
Office Action dated May 13, 2010 for U.S. Appl. No. 12/142,447.
Office Action dated Feb. 4, 2010 for U.S. Appl. No. 12/492,721.
Office Action dated Feb. 18, 2010 for U.S. Appl. No. 12/635,433.
Office Action dated Feb. 18, 2010 for U.S. Appl. No. 12/635,454.
Office Action dated May 14, 2010 for U.S. Appl. No. 12/137,441.
Office Action dated Feb. 19, 2010 for U.S. Appl. No. 12/144,459.
Office Action dated Sep. 2, 2009 for U.S. Appl. No. 12/142,433.
Office Action dated Jan. 29, 2010 for U.S. Appl. No. 12/142,433.
Office Action dated May 24, 2010 for U.S. Appl. No. 12/142,433.
Office Action dated Apr. 30, 2010 for U.S. Appl. No. 12/141,191.
Office Action dated Oct. 27, 2009 for U.S. Appl. No. 12/142,120.
Office Action dated May 5, 2010 for U.S. Appl. No. 12/571,537.
Office Action dated May 16, 2012 issued in corresponding Chinese Application No. 200880008717.3 (English Translation, 3 pgs.).
Office Action dated May 25, 2012 issued in corresponding European Patent Application No. 08771783.1 (5 pgs.).
Japanese Office Action dated Apr. 23, 2013 for corresponding Japanese Application No. 2009-552942 (2 pgs.).
Korean Notice of Grant dated Apr. 24, 2013 for corresponding Korean Application No. 10-2012-7005453 (1 pg.).
Japanese Office Action dated Apr. 24, 2013 for corresponding Japanese Application No. 2009-552941 (5 pgs.).
Korean Office Action dated Apr. 8, 2013 for corresponding Korean Application No. 10-2012-7014748 (5 pgs.).
IKA, "Introduction to IKA's Three Stage Dispax Reactor," Retrieved from <http://www.ikausa.com/pdfs/process/dr%202000-Homogenizing-Dispersing-Suspending-Emulsifying.pdf> on Aug. 22, 2012 (12 pgs.).
IKA-DRS Reactors website http://www.ikausa.com/dr.him, on Sep. 8, 2010 (2 pgs.).
Canadian Office Action dated Jan. 20, 2012 for corresponding Canadian Application No. 2,676,112 (2 pgs).
IKA-Rotor-Stator Generators—2003 Processing Catalog (38 pgs.).
Office Action dated Feb. 24, 2011 for U.S. Appl. No. 12/796,358 (13 pgs.).
Office Action dated Feb. 29, 2012 for U.S. Appl. No. 12/146,733 (8 pgs.).
Office Action dated Jun. 3, 2011 for U.S. Appl. No. 12/568,155 (11 pgs.).
Office Action dated Jun. 2, 2011 for U.S. Appl. No. 12/427,286 (12 pgs.).
Office Action dated Jun. 3, 2011 for U.S. Appl. No. 12/568,280 (16 pgs.).
Canadian Office Action dated Nov. 2, 2012 for corresponding Canadian Application No. 2,676,112 (2 pgs.).

(56) References Cited

OTHER PUBLICATIONS

Eurasian Office Action dated May 2, 2012 for corresponding Eurasian Application No. 200901023/31 (4 pgs.).
Japanese Office Action dated Sep. 18, 2012 for corresponding Japanese Application No. 2009552942 (2 pgs.).
Korean Office Action dated Mar. 8, 2012 for corresponding Korean Application No. 10-2009-7017030 (5 pgs.).
Malaysia Office Action dated Dec. 15, 2011 for corresponding Malaysia Application No. PI 20093063 (3 pgs.).
Notice of Grant dated Jun. 11, 2012 for corresponding European Application No. 08771785.6 (37 pgs.).
International Search Report and Written Opinion dated Oct. 31, 2008 for corresponding International Application No. PCT/US2008/067977 (6 pgs.).
Eurasian Office Action dated Nov. 28, 2012 for corresponding Eurasian Application No. 200901023/31 (4 pgs.).
Notice of Grant dated Dec. 5, 2012 for corresponding Chinese Application No. 200880008717.3 (4 pgs.).
Notice of Allowance dated Dec. 18, 2012 for corresponding U.S. Appl. No. 13/206,322 (18 pgs.).
Examination Report dated Jul. 4, 2013 for corresponding India Application No. 4725/DELNP/2009 (2 pgs.).
Korean Office Action dated Nov. 26, 2013 for corresponding Korean Application No. 10-2012-7014748 (6 pgs.).
Japanese Office Action dated Dec. 3, 2013 for corresponding Japanese Application No. 2009-552942 (3 pgs.).
Indonesian Examination Report dated Mar. 11, 2014 for corresponding Indonesian Application No. 4337/DELNP/2009 (2 pgs.).
European Examination Report dated Mar. 24, 2014 for corresponding European Application No. 08771783.1-1361 (8 pgs.).
Korean Office Action dated Dec. 11, 2014 for corresponding Korean Application No. 10-2014-7024167 (9 pgs.).
Korean Office Action dated Dec. 28, 2014 for corresponding Korean Application No. 10-2014-7014748 (10 pgs.).
GCC Examination Report dated Jun. 27, 2016 for related GCC Application No. 2008-11134; 6 pages.

\* cited by examiner

SYSTEM AND PROCESS FOR HYDROCRACKING

CROSS-REFERENCE TO RELATED APPLICATIONS

This application claims the benefit under 35 U.S.C. §119 (e) of U.S. Provisional Patent Application No. 60/946,449 entitled, "High Shear Hydrocracking Process," filed Jun. 27, 2007, and U.S. Provisional Patent Application No. 60/946,452 entitled, "High Shear Gas Oil Hydrocracking," filed Jun. 27, 2007, the disclosures of which are hereby incorporated herein by reference.

STATEMENT REGARDING FEDERALLY SPONSORED RESEARCH OR DEVELOPMENT

Not Applicable.

BACKGROUND OF THE INVENTION

Technical Field

The present invention generally relates to hydrocracking of hydrocarbon streams to produce lower boiling compounds. More particularly, the present invention relates to a high shear system and process for improving hydrocracking of a feedstock to produce simpler hydrocarbons.

Background of the Invention

In petroleum refining and chemistry, cracking is the process whereby complex organic molecules such as heavy hydrocarbons are broken down into simpler light hydrocarbons. The conversion occurs via the breaking of carbon-carbon bonds in the precursor molecules. The rate of cracking and the end products formed depend greatly on the temperature as well as on the presence of any catalysts. Oil refinery cracking processes allow the production of "light" products such as LPG and gasoline from heavier crude oil distillation fractions such as gas oils and residues.

Cracking may be performed by catalytic cracking or thermal cracking. In thermal cracking, elevated temperatures (~800° C.) and pressures (~700 kPa) are used. Hydrogen-rich products are formed at the expense of heavier molecules which condense and become depleted of hydrogen. Catalytic cracking involves the use of acid catalysts, typically solid acid catalysts, such as silica-alumina and zeolites. Hydrocracking is a major process for the production of jet fuel, gasoline components and LPG.

Hydrocracking is a catalytic cracking process assisted by the presence of an elevated partial pressure of hydrogen. Petroleum refinery hydrocracking processes are well known and developed. Such processes upgrade mixtures of hydrocarbons to supply more valuable product streams. The products of this process are saturated hydrocarbons. Depending on reaction conditions (temperature, pressure, and catalyst activity) the cracking products range from ethane, LPG to heavier hydrocarbons comprising mostly isoparaffins. Hydrocracking is normally facilitated by a dual function catalyst that is capable of rearranging and breaking hydrocarbon chains as well as adding hydrogen to aromatics and olefins to produce naphthenes and alkanes.

Severity of hydrocracking is increased by operating with increasingly acidic catalysts and possibly at higher temperatures and longer contact times than in hydrotreating. Increased hydrogen pressure controls deposits and catalyst fouling. Unlike thermal or catalytic cracking, hydrocracking decreases the molecular weight of aromatic compounds and fills a specific need for processing streams high in aromatic material, such as cycle stocks from catalytic or thermal cracking, coker products, or coal liquids. For example, catalytic cycle stock can be cracked to a naphtha fraction that is an excellent feed for catalytic reforming to make premium-octane gasoline or petrochemical aromatic material. Major products from hydrocracking are jet fuel, diesel, relatively high octane rating gasoline fractions and LPG. These products may have a very low content of sulfur and contaminants.

Fuel oil is a fraction obtained via petroleum distillation, either as a distillate or residue. Distillate fuel oils are distilled from crude oil. Gas oil refers to the process of distillation. The oil is heated, becomes a gas and condenses as gas oil. Gas oil is thus differentiated from residual oil. The terms heavy fuel oil and residual fuel oil are what remains of the crude oil after gasoline and the distillate fuel oils are extracted through distillation. Hydrocracking is used extensively on distillate stocks. The hydrocracking process is applied to refinery stocks for premium-quality kerosene, diesel and jet fuels. The light products from hydrocracking may also be rich in isobutane, an important raw material for alkylation.

In recent times, as the worldwide supply of light, sweet crude oil for refinery feedstock has diminished, there has been a significant trend toward conversion of higher boiling compounds to lower boiling ones. Due to this trend to heavier crude oil and the need for processing synthetic crude oil, hydrocracking has grown increasingly important. As demand for distillate fuels increases, refiners may incorporate hydrocrackers to convert, for example, vacuum gas oil (VGO) to jet and diesel fuel. Catalysts have been developed that exhibit desirable distillate selectivity, high conversion activity and stability for heavier feedstocks.

Accordingly, there is a need in industry for improving production of desirable hydrocarbons via hydrocracking of hydrocarbonaceous feedstock.

SUMMARY

High shear systems and methods for improving hydrocracking are disclosed. In accordance with certain embodiments, a method for hydrocracking a feedstream comprising liquid hydrocarbon is provided which comprises forming a dispersion comprising hydrogen-containing gas bubbles dispersed in the liquid hydrocarbon, wherein the bubbles have a mean diameter of less than about 5 µm and introducing the dispersion into a hydrocracker comprising a hydrocracking catalyst. In embodiments, the mean bubble diameter is less than 1 µm. The hydrocracking catalyst may comprise zeolite, clay, alumina, silica, zirconia, magnesia, titania, or a combination thereof.

The method may further comprise removing hydrocracked product from the hydrocracker and using a high pressure separator to remove excess hydrogen from the hydrocracked product. In embodiments, the method further comprises recycling at least a portion of recovered hydrogen to the hydrocracker. Upon removal of hydrogen in the high pressure separator, the product may be fractionated and a bottoms product obtained. The method may further comprise recycling at least a portion of the bottoms product to the hydrocracker.

Forming the dispersion may comprise subjecting a mixture of the hydrogen-containing gas and the feedstream to a shear rate of greater than about 20,000 s$^{-1}$. Forming the dispersion may comprise contacting the hydrogen-containing gas and the feedstream in a high shear device, wherein the high shear device comprises at least one rotor, and wherein the at least one rotor is rotated at a tip speed of at least 22.9 m/s (4,500 ft/min) during formation of the dispersion. The high shear device may produce a local pressure of at least about 1034.2 MPa (150,000 psi) at the tip of the at least one rotor. The energy expenditure of the high shear device may be greater than 1000 W/m$^3$. The feedstream may comprise at least one selected from residual oils, gas oils, and combinations thereof.

Also disclosed is a method for hydrocracking, the method comprising subjecting a fluid mixture comprising hydrogen-containing gas and liquid hydrocarbons to be hydrocracked to a shear rate greater than 20,000 s$^{-1}$ to produce a dispersion of hydrogen in a continuous phase of the liquid hydrocarbons, and introducing the dispersion into a fixed bed hydrocracking reactor from which a hydrocracked product is removed. The method may further comprise separating, at a first pressure, the hydrocracked product into a gas stream and a separated liquid product stream comprising hydrocracked product, fractionally distilling the separated liquid product stream at a second pressure lower than the first pressure to separate lower boiling compounds in the separated liquid product stream from higher boiling compounds, and recycling at least a portion of the higher boiling compounds to the hydrocracker. The average bubble diameter of the hydrogen gas in the dispersion may be less than about 5 μm. In embodiments, the dispersion is stable for at least about 15 minutes at atmospheric pressure. Subjecting a fluid mixture comprising hydrogen-containing gas and liquid hydrocarbons to be hydrocracked to a shear rate greater than 20,000 s$^{-1}$ may comprise introducing the fluid into a high shear device comprising at least two generators.

Also disclosed is a system for hydrocracking a hydrocarbonaceous feedstream, the system comprising: at least one high shear mixing device comprising an inlet for a fluid stream comprising a liquid hydrocarbon phase and hydrogen gas, an outlet for a dispersion of hydrogen gas in the liquid hydrocarbon phase, and at least one rotor and at least one stator separated by a shear gap, wherein the shear gap is the minimum distance between the at least one rotor and the at least stator; wherein the high shear mixing device is capable of producing a tip speed of the at least one rotor of greater than 5.0 m/s (1,000 ft/min), and a hydrocracker containing hydrocracking catalyst and comprising an inlet fluidly connected to the outlet of the external high shear mixing device. The hydrocracker may be a fixed bed reactor. The system may further comprise a separator downstream of the hydrocracker. The at least one high shear mixing device may be capable of producing a tip speed of the at least one rotor of at least 40.1 m/s (7,900 ft/min). In embodiments, the system comprises at least two high shear mixing devices.

Also disclosed is an improvement to a hydrocracking system including a fixed bed reactor of hydrocracking catalyst, the improvement comprising an external high shear device upstream of the fixed bed reactor, the external high shear device comprising an inlet for a fluid stream comprising hydrogen gas and hydrocarbons to be hydrocracked, and at least one generator comprising a rotor and a stator having a minimum clearance therebetween, wherein the high shear device provides an energy expenditure of greater than 1000 W/m$^3$ of fluid. The external high shear device of the improved system may comprise at least two generators. The shear rate provided by one generator may be greater than the shear rate provided by another generator, wherein the shear rate is the tip speed of the rotor divided by the minimum clearance.

The high shear system and process make possible a reduction in mass transfer limitations of conventional hydrocracking processes, thereby increasing the reaction rate and potentially permitting a reduction in hydrocracking reactor temperature, a reduction in reactor pressure, a reduction in contact time, and/or an increase in yield of desirable hydrocarbons. In accordance with certain embodiments of the present invention, a process is provided that makes possible an increase in the rate of the gas/liquid/solid hydrocracking process by providing for more optimal time, temperature and pressure conditions than are currently used.

In an embodiment, the process comprises the use of an external pressurized high shear device reactor to provide for hydrocracking of hydrocarbonaceous feedstock with a smaller volume hydrocracker and/or operation of the hydrocracker under less severe operating conditions (e.g., lower temperature, pressure, and/or less acidic catalyst).

Certain embodiments of the above-described methods or systems potentially provide overall cost reduction by hydrocracking at lower temperature and/or pressure, providing increased hydrocracked product per unit of catalyst consumed, decreased reaction time, and/or reduced capital and/or operating costs. These and other embodiments and potential advantages will be apparent in the following detailed description and drawings.

BRIEF DESCRIPTION OF THE DRAWINGS

For a more detailed description of the preferred embodiment of the present invention, reference will now be made to the accompanying drawings, wherein.

NOTATION AND NOMENCLATURE

As used herein, the term "dispersion" refers to a liquefied mixture that contains at least two distinguishable substances (or "phases") that will not readily mix and dissolve together. As used herein, a "dispersion" comprises a "continuous" phase (or "matrix"), which holds therein discontinuous droplets, bubbles, and/or particles of the other phase or substance. The term dispersion may thus refer to foams comprising gas bubbles suspended in a liquid continuous phase, emulsions in which droplets of a first liquid are dispersed throughout a continuous phase comprising a second liquid with which the first liquid is immiscible, and continuous liquid phases throughout which solid particles are distributed. As used herein, the term "dispersion" encompasses continuous liquid phases throughout which gas bubbles are distributed, continuous liquid phases throughout which solid particles (e.g., solid catalyst) are distributed, continuous phases of a first liquid throughout which droplets of a second liquid that is substantially insoluble in the continuous phase are distributed, and liquid phases throughout which any one or a combination of solid particles, immiscible liquid droplets, and gas bubbles are distributed. Hence, a dispersion can exist as a homogeneous mixture in some cases (e.g., liquid/liquid phase), or as a heterogeneous mixture (e.g., gas/liquid, solid/liquid, or gas/solid/liquid), depending on the nature of the materials selected for combination.

As used herein, the term "hydrocracking" means a process which consumes hydrogen and converts a hydrocarbonaceous stream, such as a petroleum fraction, to a hydrocarbon product, in which at least a portion of the high molecular weight compounds in the feed are cracked to lower boiling materials.

As used herein, the term "gas oil" refers to a hydrocarbon oil used as a fuel oil, for example a petroleum distillate intermediate in boiling range and viscosity between kerosene and lubricating oil.

With respect to hydrocracking, the activity, stability and selectivity, as utilized herein, may be defined as follows: "activity" refers to the quantity of the feedstock boiling above a given temperature which is converted to hydrocarbons boiling below the given temperature; "selectivity" refers to the quantity of converted feedstock which boils below the desired end point of the product, and above a minimum specified initial boiling point; and "stability" refers to the rate of change of activity and selectivity.

DETAILED DESCRIPTION

Overview

The rate of chemical reactions involving liquids, gases and solids depend on time of contact, temperature, and pressure. In cases where it is desirable to react two or more raw materials of different phases (e.g. solid and liquid; liquid and gas; solid, liquid and gas), one of the limiting factors controlling the rate of reaction involves the contact time of the reactants. In the case of heterogeneously catalyzed reactions there is the additional rate limiting factor of having the reacted products removed from the surface of the catalyst to permit the catalyst to catalyze further reactants. Contact time for the reactants and/or catalyst is often controlled by mixing which provides contact with two or more reactants involved in a chemical reaction.

A reactor assembly that comprises an external high shear device or mixer as described herein makes possible decreased mass transfer limitations and thereby allows the reaction to more closely approach kinetic limitations. When reaction rates are accelerated, residence times may be decreased, thereby increasing obtainable throughput. Yield of desirable hydrocracked product may be increased as a result of the high shear system and process. Alternatively, if the yield of an existing process is acceptable, decreasing the required residence time by incorporation of suitable high shear may allow for the use of lower temperatures and/or pressures than conventional hydrocracking processes.

Furthermore, without wishing to be limited by theory, it is believed that the high shear conditions provided by a reactor assembly that comprises an external high shear device or mixer as described herein may permit hydrocracking at global operating conditions under which reaction may not conventionally be expected to occur to any significant extent.

Figure 1:
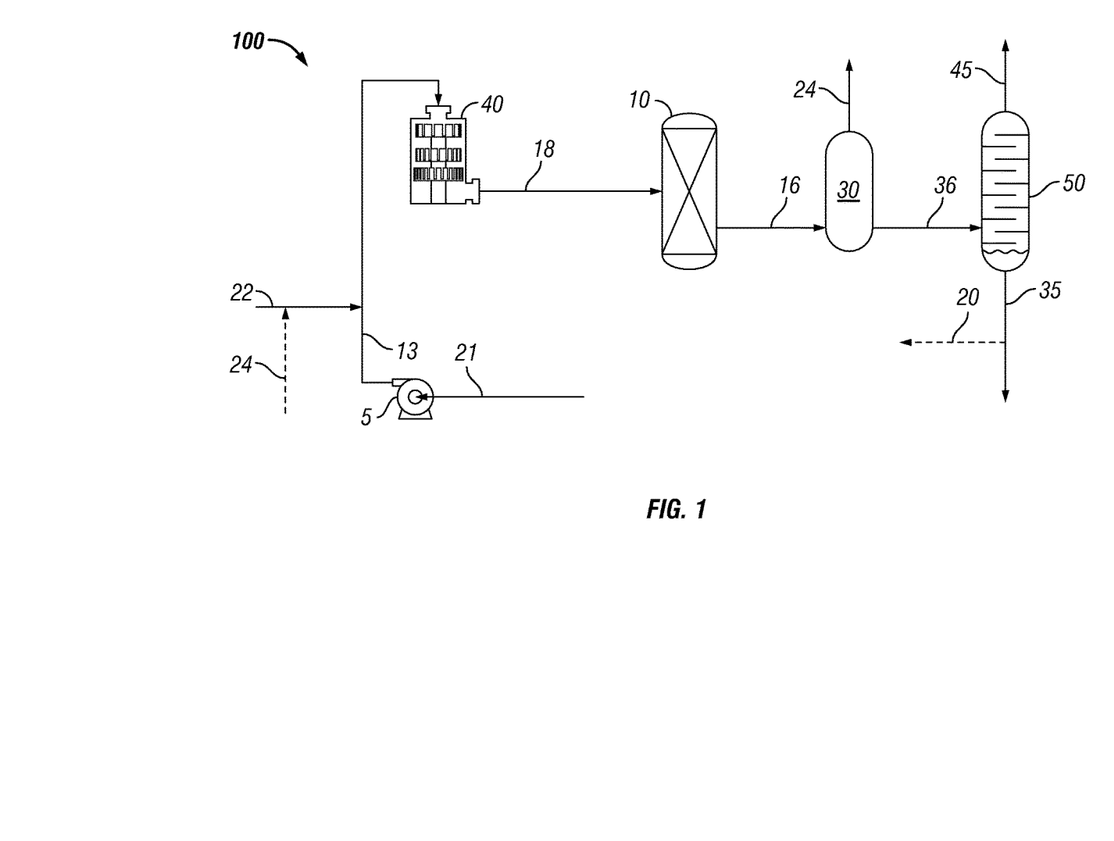
FIG. 1 is a process flow diagram according to an embodiment of the present disclosure for high shear hydrocracking of hydrocarbonaceous feedstock to produce simpler hydrocarbons.

System for Hydrocracking. A high shear hydrocracking system will now be described in relation to FIG. 1, which is a process flow diagram of an embodiment of a high shear system 100 for hydrocracking of hydrocarbonaceous fluid comprising hydrocarbons to be hydrocracked to lower boiling compounds. The basic components of a representative system include external high shear mixing device (HSD) 40, reactor 10, and pump 5. As shown in FIG. 1, high shear device 40 is located external to reactor 10. Each of these components is further described in more detail below. Line 21 is connected to pump 5 for introducing hydrocarbonaceous fluid to be hydrocracked. Line 13 connects pump 5 to HSD 40, and line 18 connects HSD 40 to reactor 10. Line 22 may be connected to line 13 for introducing a hydrogen-containing gas (e.g., $H_2$). In embodiments of high shear hydrocracking system 100, line 22 fluidly connects to an inlet of HSD 40.

High shear hydrocracking system 100 may further comprise downstream processing units by which hydrocracked liquid product exiting reactor 10 is separated from uncracked heavy oil. For example, in the embodiment of FIG. 1, high shear hydrocracking system 100 further comprises separator 30 and fractionator 50. Separator 30 may be fluidly connected via line 16 to reactor 10 and via line 36 to fractionator 50. Gas line 24 may exit separator 30 as indicated in FIG. 1. Separator 30 may comprise a high pressure separator from which hydrogen and light gases are removed from liquid product comprising hydrocracked hydrocarbons. Fractionator 50 may be adapted to separate hydrocracked product which may exit fractionator 50 via overhead line 45 from heavy unconverted oil which may exit the bottom of fractionator 50 via line 35. Fractionator 50 may be a fractional distillation column.

Additional components or process steps may be incorporated between reactor 10 and HSD 40, or ahead of pump 5 or HSD 40, if desired (not shown in FIG. 1), as will become apparent upon reading the description of the high shear hydrocracking process described hereinbelow. For example, line 20 may be connected to line 21 or line 13 from a downstream location (e.g., from reactor 10, separator 30, or fractionator 50), to provide for multi-pass operation and hydrocrack at least a portion of the unconverted or heavy hydrocarbon exiting reactor 10, if desired. In embodiments, lines 20 and 21 are a single line.

High Shear Mixing Device.

External high shear mixing device (HSD) 40, also sometimes referred to as a high shear device or high shear mixing device, is configured for receiving an inlet stream, via line 13, comprising hydrogen gas and hydrocarbonaceous liquid containing higher molecular weight hydrocarbons to be hydrocracked to lower boiling point compounds. Alternatively, HSD 40 may be configured for receiving the liquid and gaseous reactant streams via separate inlet lines (not shown). Although only one high shear device is shown in FIG. 1, it should be understood that some embodiments of the system may have two or more high shear mixing devices arranged either in series or parallel flow. HSD 40 is a mechanical device that utilizes one or more generator comprising a rotor/stator combination, each of which has a gap between the stator and rotor. The gap between the rotor and the stator in each generator set may be fixed or may be adjustable. HSD 40 is configured in such a way that it is capable of producing submicron and micron-sized bubbles in a reactant mixture flowing through the high shear device. The high shear device comprises an enclosure or housing so that the pressure and temperature of the reaction mixture may be controlled.

High shear mixing devices are generally divided into three general classes, based upon their ability to mix fluids. Mixing is the process of reducing the size of particles or inhomogeneous species within the fluid. One metric for the degree or thoroughness of mixing is the energy density per unit volume that the mixing device generates to disrupt the fluid particles. The classes are distinguished based on delivered energy densities. Three classes of industrial mixers having sufficient energy density to consistently produce mixtures or emulsions with particle sizes in the range of submicron to 50 microns include homogenization valve systems, colloid mills and high speed mixers. In the first class of high energy devices, referred to as homogenization valve systems, fluid to be processed is pumped under very high pressure through a narrow-gap valve into a lower pressure environment. The pressure gradients across the valve and the resulting turbulence and cavitation act to break-up any particles in the fluid. These valve systems are most commonly used in milk homogenization and can yield average particle sizes in the submicron to about 1 micron range.

At the opposite end of the energy density spectrum is the third class of devices referred to as low energy devices. These systems usually have paddles or fluid rotors that turn at high speed in a reservoir of fluid to be processed, which in many of the more common applications is a food product. These low energy systems are customarily used when average particle sizes of greater than 20 microns are acceptable in the processed fluid.

Between the low energy devices and homogenization valve systems, in terms of the mixing energy density delivered to the fluid, are colloid mills and other high speed rotor-stator devices, which are classified as intermediate energy devices. A typical colloid mill configuration includes a conical or disk rotor that is separated from a complementary, liquid-cooled stator by a closely-controlled rotor-stator gap, which is commonly between 0.0254 mm to 10.16 mm (0.001-0.40 inch). Rotors are usually driven by an electric motor through a direct drive or belt mechanism. As the rotor rotates at high rates, it pumps fluid between the outer surface of the rotor and the inner surface of the stator, and shear forces generated in the gap process the fluid. Many colloid mills with proper adjustment achieve average particle sizes of 0.1-25 microns in the processed fluid. These capabilities render colloid mills appropriate for a variety of applications including colloid and oil/water-based emulsion processing such as that required for cosmetics, mayonnaise, or silicone/silver amalgam formation, to roofing-tar mixing.

Tip speed is the circumferential distance traveled by the tip of the rotor per unit of time. Tip speed is thus a function of the rotor diameter and the rotational frequency. Tip speed (in meters per minute, for example) may be calculated by multiplying the circumferential distance transcribed by the rotor tip, $2\pi R$, where R is the radius of the rotor (meters, for example) times the frequency of revolution (for example revolutions per minute, rpm). A colloid mill, for example, may have a tip speed in excess of 22.9 m/s (4500 ft/min) and may exceed 40 m/s (7900 ft/min). For the purpose of this disclosure, the term 'high shear' refers to mechanical rotor stator devices (e.g., colloid mills or rotor-stator dispersers) that are capable of tip speeds in excess of 5.1 m/s. (1000 ft/min) and require an external mechanically driven power device to drive energy into the stream of products to be reacted. For example, in HSD 40, a tip speed in excess of 22.9 m/s (4500 ft/min) is achievable, and may exceed 40 m/s (7900 ft/min). In some embodiments, HSD 40 is capable of delivering at least 300 L/h at a tip speed of at least 22.9 m/s (4500 ft/min). The power consumption may be about 1.5 kW. HSD 40 combines high tip speed with a very small shear gap to produce significant shear on the material being processed. The amount of shear will be dependent on the viscosity of the fluid. Accordingly, a local region of elevated pressure and temperature is created at the tip of the rotor during operation of the high shear device. In some cases the locally elevated pressure is about 1034.2 MPa (150,000 psi). In some cases the locally elevated temperature is about 500° C. In some cases, these local pressure and temperature elevations may persist for nano or pico seconds.

An approximation of energy input into the fluid (kW/L/min) can be estimated by measuring the motor energy (kW) and fluid output (L/min). As mentioned above, tip speed is the velocity (ft/min or m/s) associated with the end of the one or more revolving elements that is creating the mechanical force applied to the reactants. In embodiments, the energy expenditure of HSD 40 is greater than 1000 W/m³. In embodiments, the energy expenditure of HSD 40 is in the range of from about 3000 W/m³ to about 7500 W/m³. In embodiments in which slurry-based catalyst is circulated through HSD 40, it may be desirable to utilize revolving elements which are made of a durable material, such as ceramic.

The shear rate is the tip speed divided by the shear gap width (minimal clearance between the rotor and stator). The shear rate generated in HSD 40 may be in the greater than 20,000 $s^{-1}$. In some embodiments the shear rate is at least 40,000 $s^{-1}$. In some embodiments the shear rate is at least 100,000 $s^{-1}$. In some embodiments the shear rate is at least 500,000 $s^{-1}$. In some embodiments the shear rate is at least 1,000,000 $s^{-1}$. In some embodiments the shear rate is at least 1,600,000 $s^{-1}$. In embodiments, the shear rate generated by HSD 40 is in the range of from 20,000 $s^{-1}$ to 100,000 $s^{-1}$. For example, in one application the rotor tip speed is about 40 m/s (7900 ft/min) and the shear gap width is 0.0254 mm (0.001 inch), producing a shear rate of 1,600,000 $s^{-1}$. In another application the rotor tip speed is about 22.9 m/s (4500 ft/min) and the shear gap width is 0.0254 mm (0.001 inch), producing a shear rate of about 901,600 $s^{-1}$.

HSD 40 is capable of highly dispersing or transporting hydrogen into a main liquid phase (continuous phase) comprising hydrocarbonaceous fluid, with which it would normally be immiscible, at conditions such that a dispersion of hydrogen in continuous liquid phase is produced and exits HSD 40 via line 18. It is envisioned that, in embodiments, the hydrocarbonaceous fluid further comprises a catalyst which is circulated about high shear hydrocracking system 100. In some embodiments, HSD 40 comprises a colloid mill. Suitable colloidal mills are manufactured by IKA® Works, Inc. Wilmington, N.C. and APV North America, Inc. Wilmington, Mass., for example. In some instances, HSD 40 comprises the DISPAX REACTOR® of IKA® Works, Inc.

The high shear device comprises at least one revolving element that creates the mechanical force applied to the reactants. The high shear device comprises at least one stator and at least one rotor separated by a clearance. For example, the rotors may be conical or disk shaped and may be separated from a complementarily-shaped stator. In embodiments, both the rotor and stator comprise a plurality of circumferentially-spaced teeth. In some embodiments, the stator(s) are adjustable to obtain the desired shear gap between the rotor and the stator of each generator (rotor/stator set). Grooves between the teeth of the rotor and/or stator may alternate direction in alternate stages for increased turbulence. Each generator may be driven by any suitable drive system configured for providing the necessary rotation.

In some embodiments, the minimum clearance (shear gap width) between the stator and the rotor is in the range of from about 0.0254 mm (0.001 inch) to about 3.175 mm (0.125 inch). In certain embodiments, the minimum clearance (shear gap width) between the stator and rotor is about 1.52 mm (0.060 inch). In certain configurations, the minimum clearance (shear gap) between the rotor and stator is at least 1.78 mm (0.07 inch). The shear rate produced by the high shear device may vary with longitudinal position along the flow pathway. In some embodiments, the rotor is set to rotate at a speed commensurate with the diameter of the rotor and the desired tip speed. In some embodiments, the high shear device has a fixed clearance (shear gap width)

between the stator and rotor. Alternatively, the high shear device has adjustable clearance (shear gap width).

In some embodiments, HSD 40 comprises a single stage dispersing chamber (i.e., a single rotor/stator combination, a single generator). In some embodiments, high shear device 40 is a multiple stage inline disperser and comprises a plurality of generators. In certain embodiments, HSD 40 comprises at least two generators. In other embodiments, high shear device 40 comprises at least 3 high shear generators. In some embodiments, high shear device 40 is a multistage mixer whereby the shear rate (which, as mentioned above, varies proportionately with tip speed and inversely with rotor/stator gap width) varies with longitudinal position along the flow pathway, as further described herein below.

In some embodiments, each stage of the external high shear device has interchangeable mixing tools, offering flexibility. For example, the DR 2000/4 DISPAX REACTOR® of IKA® Works, Inc. Wilmington, N.C. and APV North America, Inc. Wilmington, Mass., comprises a three stage dispersing module. This module may comprise up to three rotor/stator combinations (generators), with choice of fine, medium, coarse, and super-fine for each stage. This allows for creation of dispersions having a narrow distribution of the desired bubble size (e.g., hydrogen gas bubbles). In some embodiments, each of the stages is operated with super-fine generator. In some embodiments, at least one of the generator sets has a rotor/stator minimum clearance (shear gap width) of greater than about 5.08 mm (0.20 inch). In alternative embodiments, at least one of the generator sets has a minimum rotor/stator clearance of greater than about 1.78 mm (0.07 inch).

Figure 2:
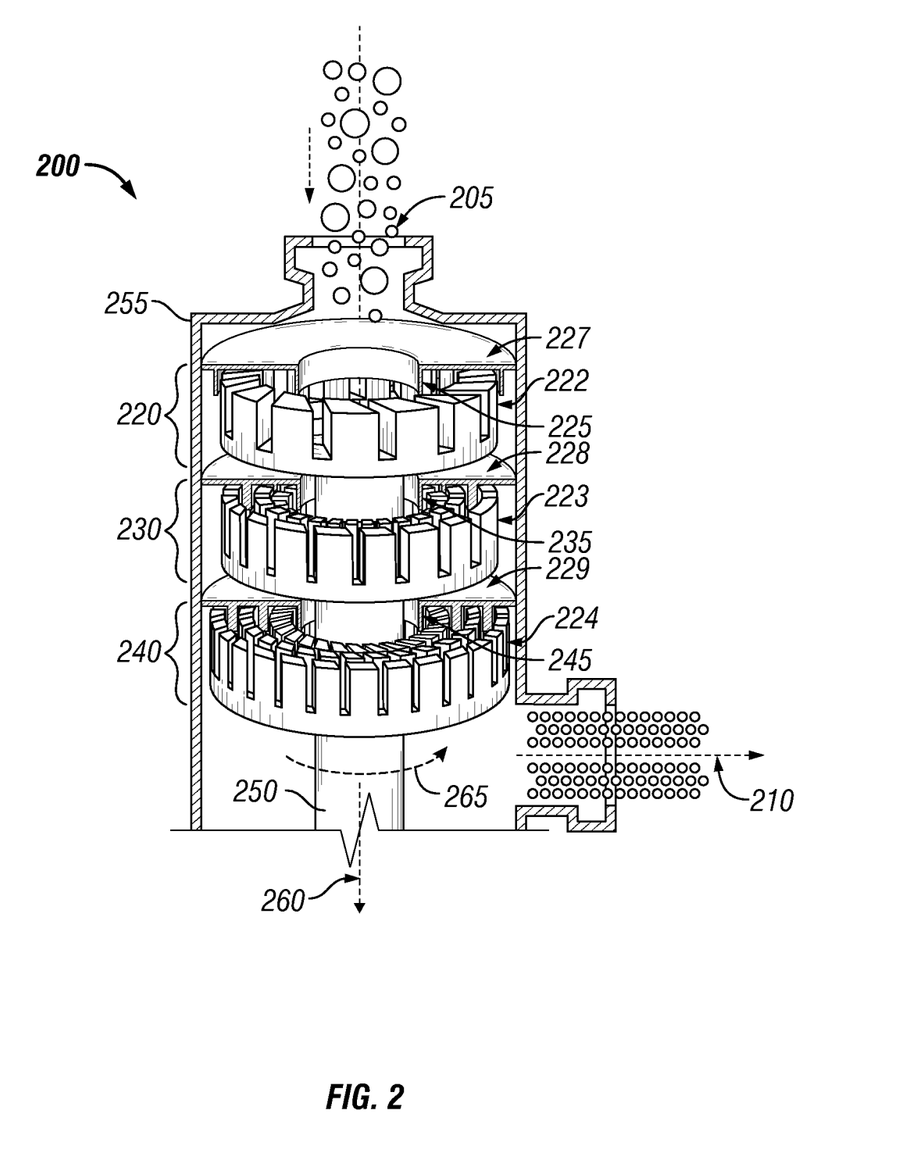
FIG. 2 is a longitudinal cross-section view of a multistage high shear device, as employed in an embodiment of the system.

Referring now to FIG. 2, there is presented a longitudinal cross-section of a suitable high shear device 200. High shear device 200 of FIG. 2 is a dispersing device comprising three stages or rotor-stator combinations. High shear device 200 is a dispersing device comprising three stages or rotor-stator combinations, 220, 230, and 240. The rotor-stator combinations may be known as generators 220, 230, 240 or stages without limitation. Three rotor/stator sets or generators 220, 230, and 240 are aligned in series along drive shaft 250.

First generator 220 comprises rotor 222 and stator 227. Second generator 230 comprises rotor 223, and stator 228. Third generator 240 comprises rotor 224 and stator 229. For each generator the rotor is rotatably driven by input 250 and rotates about axis 260 as indicated by arrow 265. The direction of rotation may be opposite that shown by arrow 265 (e.g., clockwise or counterclockwise about axis of rotation 260). Stators 227, 228, and 229 are fixably coupled to the wall 255 of high shear device 200.

As mentioned hereinabove, each generator has a shear gap width which is the minimum distance between the rotor and the stator. In the embodiment of FIG. 2, first generator 220 comprises a first shear gap 225; second generator 230 comprises a second shear gap 235; and third generator 240 comprises a third shear gap 245. In embodiments, shear gaps 225, 235, 245 have widths in the range of from about 0.025 mm to about 10.0 mm. Alternatively, the process comprises utilization of a high shear device 200 wherein the gaps 225, 235, 245 have a width in the range of from about 0.5 mm to about 2.5 mm. In certain instances the shear gap width is maintained at about 1.5 mm. Alternatively, the width of shear gaps 225, 235, 245 are different for generators 220, 230, 240. In certain instances, the width of shear gap 225 of first generator 220 is greater than the width of shear gap 235 of second generator 230, which is in turn greater than the width of shear gap 245 of third generator 240. As mentioned above, the generators of each stage may be interchangeable, offering flexibility. High shear device 200 may be configured so that the shear rate will increase stepwise longitudinally along the direction of the flow 260.

Generators 220, 230, and 240 may comprise a coarse, medium, fine, and super-fine characterization. Rotors 222, 223, and 224 and stators 227, 228, and 229 may be toothed designs. Each generator may comprise two or more sets of rotor-stator teeth. In embodiments, rotors 222, 223, and 224 comprise more than 10 rotor teeth circumferentially spaced about the circumference of each rotor. In embodiments, stators 227, 228, and 229 comprise more than ten stator teeth circumferentially spaced about the circumference of each stator. In embodiments, the inner diameter of the rotor is about 12 cm. In embodiments, the diameter of the rotor is about 6 cm. In embodiments, the outer diameter of the stator is about 15 cm. In embodiments, the diameter of the stator is about 6.4 cm. In some embodiments the rotors are 60 mm and the stators are 64 mm in diameter, providing a clearance of about 4 mm. In certain embodiments, each of three stages is operated with a super-fine generator, comprising a shear gap of between about 0.025 mm and about 4 mm. For applications in which solid particles are to be sent through high shear device 40, the appropriate shear gap width (minimum clearance between rotor and stator) may be selected for an appropriate reduction in particle size and increase in particle surface area. In embodiments, this may be beneficial for increasing catalyst surface area by shearing and dispersing the particles.

High shear device 200 is configured for receiving from line 13 a reactant stream at inlet 205. The reaction mixture comprises hydrogen as the dispersible phase and hydrocarbonaceous liquid as the continuous phase. The feed stream may further comprise a particulate solid catalyst component. Feed stream entering inlet 205 is pumped serially through generators 220, 230, and then 240, such that product dispersion is formed. Product dispersion exits high shear device 200 via outlet 210 (and line 18 of FIG. 1). The rotors 222, 223, 224 of each generator rotate at high speed relative to the fixed stators 227, 228, 229, providing a high shear rate. The rotation of the rotors pumps fluid, such as the feed stream entering inlet 205, outwardly through the shear gaps (and, if present, through the spaces between the rotor teeth and the spaces between the stator teeth), creating a localized high shear condition. High shear forces exerted on fluid in shear gaps 225, 235, and 245 (and, when present, in the gaps between the rotor teeth and the stator teeth) through which fluid flows process the fluid and create product dispersion. Product dispersion exits high shear device 200 via high shear outlet 210 (and line 18 of FIG. 1).

The product dispersion has an average gas bubble size less than about 5 µm. In embodiments, HSD 40 produces a dispersion having a mean bubble size of less than about 1.5 µm. In embodiments, HSD 40 produces a dispersion having a mean bubble size of less than 1 µm; preferably the bubbles are sub-micron in diameter. In certain instances, the average bubble size is from about 0.1 µm to about 1.0 µm. In embodiments, HSD 40 produces a dispersion having a mean bubble size of less than 400 nm. In embodiments, HSD 40 produces a dispersion having a mean bubble size of less than 100 nm. High shear device 200 produces a dispersion comprising dispersed gas bubbles capable of remaining dispersed at atmospheric pressure for at least about 15 minutes.

Not to be limited by theory, it is known in emulsion chemistry that sub-micron particles, or bubbles, dispersed in a liquid undergo movement primarily through Brownian motion effects. The bubbles in the product dispersion created by high shear device 200 may have greater mobility through boundary layers of solid catalyst particles (for example, through solid catalyst in reactor 10), thereby facilitating and accelerating the catalytic reaction through enhanced transport of reactants.

In certain instances, high shear device 200 comprises a DISPAX REACTOR® of IKA® Works, Inc. Wilmington, N.C. and APV North America, Inc. Wilmington, Mass. Several models are available having various inlet/outlet connections, horsepower, tip speeds, output rpm, and flow rate. Selection of the high shear device will depend on throughput requirements and desired particle or bubble size in dispersion in line 18 (FIG. 1) exiting outlet 210 of high shear device 200. IKA® model DR 2000/4, for example, comprises a belt drive, 4M generator, PTFE sealing ring, inlet flange 25.4 mm (1 inch) sanitary clamp, outlet flange 19 mm (¾ inch) sanitary clamp, 2HP power, output speed of 7900 rpm, flow capacity (water) approximately 300-700 L/h (depending on generator), a tip speed of from 9.4-41 m/s (1850 ft/min to 8070 ft/min).

Reactor.

In embodiments, vessel or reactor 10 is any type of vessel in which hydrocracking can propagate. For instance, a continuous or semi-continuous stirred tank reactor, or one or more batch reactors may be employed in series or in parallel. In applications reactor 10 is a fixed bed reactor. In embodiments, reactor 10 is a slurry bed reactor. Thus, in embodiments, reactor 10 comprises a fixed, uncirculated catalyst, and feedstream in line 21 comprises catalyst-free liquid hydrocarbon.

Any number of reactor 10 inlet streams is envisioned, with one shown in FIG. 1 (line 18). In embodiments, reactor 10 is an extinction hydrocracking reactor. Reactor 10 may be either a single-stage "extinction" recycle reactor or the second-stage "extinction" recycle reactor of a two-stage hydrocracker. The conversion may be conducted by contacting the feedstock dispersion from line 18 with a fixed stationary bed of catalyst, a fixed fluidized bed of catalyst or with a transport bed of catalyst. In embodiments, reactor 10 is a trickle-bed in which the feed dispersion is allowed to trickle through a stationary fixed bed of catalyst. With such a configuration, it may be desirable to initiate the reaction with fresh catalyst at a moderate temperature which may be raised as the catalyst ages, in order to maintain catalytic activity.

Reactor 10 may further comprise, for example, an inlet line for catalyst connected to reactor 10 for receiving a catalyst solution or slurry during operation of the system. Reactor 10 may comprise an exit line (not shown in FIG. 1) for vent gas which may comprise unreacted hydrogen. Reactor 10 comprises an outlet line 16 for a product stream comprising hydrocarbon product comprising lower boiling materials formed by cracking of at least a portion of the high molecular weight compounds in the hydrocarbonaceous feedstream. In embodiments, reactor 10 comprises a plurality of reactor product lines 16.

Hydrocracking reactions will occur whenever suitable time, temperature and pressure conditions exist. In this sense hydrocracking of high molecular weight compounds in the hydrocarbonaceous feedstream may occur at any point in the flow diagram of FIG. 1 if temperature and pressure conditions are suitable. If a circulated slurry based catalyst is utilized, reaction may be more likely to occur at points outside reactor 10 shown of FIG. 1. Nonetheless a discrete hydrocracking reactor 10 is often desirable to allow for increased residence time, agitation and heating and/or cooling. When a catalyst bed is utilized, reactor 10 may be a fixed bed reactor and may be the primary location for the hydrocracking to occur due to the presence of catalyst and its effect on the rate of hydrocracking. When reactor 10 is utilized, reactor 10 may be operated as slurry reactor, fixed bed reactor, trickle bed reactor, fluidized bed reactor, bubble column, or other method known to one of skill in the art. In some applications, the incorporation of external high shear device 40 will permit, for example, the operation of trickle bed reactors as slurry reactors.

Reactor 10 may include one or more of the following components: stirring system, heating and/or cooling capabilities, pressure measurement instrumentation, temperature measurement instrumentation, one or more injection points, and level regulator (not shown), as are known in the art of reaction vessel design. For example, a stirring system may include a motor driven mixer. A heating and/or cooling apparatus may comprise, for example, a heat exchanger.

Catalyst

In embodiments, the hydrocracking reaction carried out by high shear process 100 is a heterogeneous catalytic reaction involving a solid catalyst, hydrogen gas and liquid hydrocarbonaceous phase. In embodiments, reactor 10 comprises a fixed or fluidized bed of hydrocracking catalyst. In embodiments, the catalyst can be categorized as a dual-function catalyst which possesses both hydrocracking (acid component) and hydrogenation activity. In embodiments, the catalyst comprises at least one metal selected from noble metals such as platinum or palladium and non-noble metals such as nickel, cobalt, molybdenum, tungsten, iron, chromium and combinations of these metals. In embodiments, the catalyst comprises a combination of metals such as cobalt with molybdenum. In embodiments, hydrocracking is intended to be accompanied by some hydrorefining (desulfurization, denitrification, etc.) and the catalytic metallic component comprises nickel and molybdenum, or nickel and tungsten.

The hydrocracking catalysts may be employed with an inorganic oxide matrix component which may be selected from, for example, amorphous catalytic inorganic oxides, e.g., catalytically active silica-aluminas, clays, silicas, aluminas, magnesias, titanias, zirconias, silica-aluminas, silica-zirconias, silica-magnesias, alumina-borias, alumina-titanias and the like and mixtures thereof. Although the catalyst may be subjected to chemical change in the reaction zone due to the presence of hydrogen and sulfur therein, the catalyst may be in the form of the oxide or sulfide when first brought into contact with the dispersion of hydrogen in hydrocarbonaceous feedstream.

The acidic cracking component of the hydrocracking catalyst may be an amorphous material such as an acidic clay, alumina, silica, or amorphous silica-alumina. Longer life catalyst may comprise a high amount of molecular sieve. Such catalysts with a higher degree of molecular sieve are the "zeolite" type catalysts. In conventional usage the term "molecular sieve" refers to a material having a fixed, open-network structure, usually crystalline, that may be used to separate hydrocarbons or other mixtures by selective occlusion of one or more of the constituents, or may be used as a catalyst in a catalytic conversion process. The term "zeolite" refers to a molecular sieve containing a silicate lattice, usually in association with some aluminum, boron, gallium, iron, and/or titanium.

In embodiments, the catalyst comprises an acidic cracking component comprising a zeolite. Large pore zeolites such as zeolites X or Y may be suitable because the principal components of the feedstocks (e.g., gas oils, coker bottoms, reduced crudes, recycle oils, FCC bottoms) are higher molecular weight hydrocarbons which will not enter the internal pore structure of smaller pore zeolites and therefore will not undergo suitable conversion.

In some embodiments, the hydrocracking catalyst comprises an aluminosilicate component. Representative of the zeolitic aluminosilicates employable as component parts of hydrocracking catalysts are Zeolite Y (including steam stabilized, e.g., ultra-stable Y), Zeolite X, Zeolite beta, Zeolite ZK, Zeolite ZSM-3, faujasite, MCM-22, LZ, ZSM-5-type zeolites, e.g., ZSM-5, ZSM-11, ZSM-12, ZSM-23, ZSM-35, ZSM-38, ZSM-48, ZSM-20, crystalline silicates such as silicalite, erionite, mordenite, offretite, chabazite, FU-1-type zeolite, NU-type zeolites, LZ-210-type zeolite and mixtures thereof.

In embodiments, the catalyst comprises an amorphous material together with a crystalline zeolite, as described in U.S. Pat. No. 3,523,887. In embodiments, the catalyst is a catalyst as described in U.S. Pat. No. 5,391,287. Heavy hydrocarbon oils may be simultaneously hydrocracked and hydrodewaxed to produce a liquid product of satisfactory pour point and viscosity. This product may be obtained by the use of a catalyst comprising SSZ-35 zeolite. In embodiments, the hydrocarbonaceous feedstream in line 21 comprises heavy hydrocarbon oils [e.g., gas oil boiling above 343° C. (650° F.)] and a SSZ-35 zeolite catalyst is employed.

In embodiments, reactor 10 comprises a nickel hydrogenation catalyst, for example a catalyst according to U.S. Pat. No. 3,884,798, which is a coextruded catalytic composite of an alumina-containing porous carrier material and from about 6.5 to about 10.5% by weight of a nickel component, calculated as the elemental metal. This catalyst may be employed, for example, to obtain maximum production of LPG (liquefied petroleum gas) in the propane/butane range from hydrocarbonaceous feedstock comprising naphtha, or gasoline boiling range distillates. In embodiments, a nickel catalyst is used to convert heavier feedstocks, such as kerosenes, light gas oils, heavy gas oils, full boiling range gas oils and "black oils" into lower-boiling, normally liquid products including gasolines, kerosenes, middle-distillates, lube oils, etc.

The catalyst may be regenerable by contact at elevated temperature with hydrogen gas, for example, or by burning in air or other oxygen-containing gas.

Heat Transfer Devices.

In addition to the above-mentioned heating/cooling capabilities of reactor 10, other external or internal heat transfer devices for heating or cooling a process stream are also contemplated in variations of the embodiments illustrated in FIG. 1. For example, heat may be removed from or added to reactor 10 via any method known to one skilled in the art. The use of external heating and/or cooling heat transfer devices is also contemplated. Some suitable locations for one or more such heat transfer devices are between pump 5 and HSD 40, between HSD 40 and reactor 10, and upstream of pump 5. Some non-limiting examples of such heat transfer devices are shell, tube, plate, and coil heat exchangers, as are known in the art.

Pumps.

Pump 5 is configured for either continuous or semi-continuous operation, and may be any suitable pumping device that is capable of providing greater than 202.65 kPa (2 atm) pressure, preferably greater than 303.975 kPa (3 atm) pressure, to allow controlled flow through HSD 40 and system 100. Pump 5 may be capable of providing a pressure of greater than 7,000 kPa (69 atm). For example, a Roper Type 1 gear pump, Roper Pump Company (Commerce Ga.) Dayton Pressure Booster Pump Model 2P372E, Dayton Electric Co (Niles, Ill.) is one suitable pump. Preferably, all contact parts of the pump comprise stainless steel, for example, 316 stainless steel. In some embodiments of the system, pump 5 is capable of pressures greater than about 2026.5 kPa (20 atm). In addition to pump 5, one or more additional pumps (not shown) may be included in the system illustrated in FIG. 1. For example, a booster pump, which may be similar to pump 5, may be included between HSD 40 and reactor 10 for boosting the pressure into reactor 10, or a pump may be positioned on line 24 for recycle of hydrogen-containing gas to HSD 40. As another example, a supplemental feed pump, which may be similar to pump 5, may be included for introducing additional reactants or catalyst into reactor 10. In embodiments in which a catalyst slurry comprising solid catalyst is circulated throughout high shear system 100, it may be desirable to utilize pumps made of durable material such as ceramic to minimize erosion.

Production of Hydrocracked Product by Hydrocracking a Hydrocarbonaceous Feedstock Comprising High Molecular Weight Compounds.

Operation of high shear hydrocracking system 100 will now be discussed with reference to FIG. 1. In operation for the hydrocracking of heavy hydrocarbons, a dispersible hydrogen-containing gas stream is introduced into system 100 via line 22, and combined in line 13 with a feedstream comprising heavy hydrocarbons to be hydrocracked.

Feedstream

The hydrocarbonaceous feedstream in line 21 may be a hydrocarbonaceous feed typical for hydrocracking. The present process may be used for hydrocracking a variety of feedstocks such as crude petroleum, reduced crudes (coker tower bottoms fraction reduced crude), vacuum tower residua, coker gas oils, cycle oils, FCC tower bottoms, vacuum gas oils, deasphalted (vacuum) residua and other heavy oils. In embodiments, the hydrocarbonaceous feedstream comprises vacuum gas oil, gas oil, heavy oil, reduced crude, vacuum distillation residua, or a combination thereof.

The hydrocarbonaceous feedstock may be selected from heavy naphthas, kerosenes, refractory catalytically cracked cycle stocks, high boiling virgin and coker gas oils, and combinations thereof. Oils derived from coal, shale or tar sands may also be treated via the disclosed high shear hydrocracking process. At high severities, hydrocracking may convert these materials to gasoline and lower boiling paraffins; lesser severities may permit the higher boiling feedstocks to be converted into lighter distillates such as diesel fuels and aviation kerosenes.

In the refining of crude petroleum oils, it is customary to fractionally distill the crude at atmospheric pressure to recover gasoline, naphtha, kerosene and atmospheric gas oils as overhead leaving as still bottoms an atmospheric residuum. Distillation is then continued at reduced pressure and there is obtained overhead vacuum gas oils and light lubricating oil distillates leaving a vacuum residuum. In embodiments, the hydrocarbonaceous feedstream comprises vacuum gas oil boiling from about 343° C. (650° F.) to about 593° C. (1100° F.) and gas oils boiling from about 204° C. (400° F.) to about 343° C. (650° F.). In embodiments, feedstream in line 21 comprises vacuum gas oil boiling around 343° C. (650° F.) to about 593° C. (1100° F.) from a crude unit vacuum column or residual desulphurization unit vacuum column. In embodiments, the hydrocarbonaceous feedstream comprises oils generally boiling above 343° C. (650° F.). In embodiments, the hydrocarbonaceous feedstream comprises heavy oils containing high molecular weight long chain paraffins and high molecular weight aromatics with a large proportion of fused ring aromatics. In embodiments, the feedstock comprises atmospheric residuum.

In embodiments, a preliminary hydrotreating step (not shown in FIG. 1) is used to remove nitrogen and sulfur and to saturate aromatics to naphthenes without substantial boiling range conversion. This hydrotreating may improve hydrocracking catalyst performance and permit lower temperatures, higher space velocities, lower pressures or combinations of these conditions to be employed.

As mentioned above, hydrocarbonaceous feedstock in line 21 is pumped via line 13 into HSD 40. In some embodiments, feedstock to HSD 40 comprises fresh hydrocarbonaceous fluid and a recycle stream comprising unconverted hydrocarbons, for example, from reactor 10, separator 30, or fractionator 50.

Hydrogen gas is introduced with the hydrocarbonaceous feedstock into HSD 40. Hydrogen may be introduced into HSD 40 by introduction into line 13 via dispersible gas line 22. In alternative embodiments, hydrogen and liquid hydrocarbonaceous feedstock are introduced separately into HSD 40. In embodiments, the feedstream to HSD 40 comprises an excess of hydrogen. Use of excess hydrogen in hydrocracker 10 may provide for rapid hydrogenation of the broken carbon to carbon bond resulting in enhanced desirable product yield and selectivity.

A portion of dispersible hydrogen stream in line 22 may comprise net recycle hydrogen from stream 24, for example, which may be recycled to HSD 40 via line 24. It should be noted that FIG. 1 is a simplified process diagram and many pieces of process equipment, such as separators, heaters and compressors, have been omitted for clarity.

The hydrogen-containing gas may be substantially pure hydrogen, or a gas stream comprising hydrogen. In embodiments, the hydrogen-containing gas is fed directly into HSD 40, instead of being combined with the liquid reactant stream (i.e., hydrocarbonaceous fluid) in line 13. Pump 5 may be operated to pump the liquid reactant (hydrocarbonaceous fluid comprising high molecular weight compounds to be hydrocracked) through line 21, and to build pressure and feed HSD 40, providing a controlled flow throughout high shear device (HSD) 40 and high shear system 100. In some embodiments, pump 5 increases the pressure of the HSD inlet stream to greater than 202.65 kPa (2 atm), preferably greater than about 303.975 kPa (3 atmospheres). In this way, high shear system 100 may combine high shear with pressure to enhance reactant intimate mixing.

After pumping, the hydrogen and liquid reactants (higher molecular weight hydrocarbon compounds in line 13) are mixed within HSD 40, which serves to create a fine dispersion of the hydrogen-containing gas in the hydrocarbonaceous fluid. In HSD 40, the hydrogen-containing gas and hydrocarbonaceous fluid are highly dispersed such that nanobubbles, submicron-sized bubbles, and/or microbubbles of hydrogen gas are formed for superior dissolution into solution and enhancement of reactant mixing. In high shear hydrocracking system 100, dispersion in line 18 from high shear device 40 comprises a dispersion of hydrogen-containing gas bubbles in liquid phase comprising hydrocarbonaceous compounds to be hydrocracked. For example, disperser IKA® model DR 2000/4, a high shear, three stage dispersing device configured with three rotors in combination with stators, aligned in series, may be used to create the dispersion of dispersible hydrogen-containing gas in liquid medium comprising higher molecular weight hydrocarbons to be hydrocracked (i.e., "the reactants"). The rotor/stator sets may be configured as illustrated in FIG. 2, for example. The combined reactants enter the high shear device via line 13 and enter a first stage rotor/stator combination. The rotors and stators of the first stage may have circumferentially spaced first stage rotor teeth and stator teeth, respectively. The coarse dispersion exiting the first stage enters the second rotor/stator stage. The rotor and stator of the second stage may also comprise circumferentially spaced rotor teeth and stator teeth, respectively. The reduced bubble-size dispersion emerging from the second stage enters the third stage rotor/stator combination, which may comprise a rotor and a stator having rotor teeth and stator teeth, respectively. The dispersion exits the high shear device via line 18.

In some embodiments, the shear rate increases stepwise longitudinally along the direction of the flow, 260. For example, in some embodiments, the shear rate in the first rotor/stator stage is greater than the shear rate in subsequent stage(s). In other embodiments, the shear rate is substantially constant along the direction of the flow, with the shear rate in each stage being substantially the same.

If the high shear device 40 includes a PTFE seal, the seal may be cooled using any suitable technique that is known in the art. For example, the reactant stream flowing in line 13 may be used to cool the seal and in so doing be preheated as desired prior to entering high shear device 40.

The rotor(s) of HSD 40 may be set to rotate at a speed commensurate with the diameter of the rotor and the desired tip speed. As described above, the high shear device (e.g., colloid mill or toothed rim disperser) has either a fixed clearance between the stator and rotor or has adjustable clearance. HSD 40 serves to intimately mix the hydrogen-containing gas and the reactant liquid (i.e., hydrocarbonaceous feedstock in line 13). In some embodiments of the process, the transport resistance of the reactants is reduced by operation of the high shear device such that the velocity of the reaction is increased by greater than about 5%. In some embodiments of the process, the transport resistance of the reactants is reduced by operation of the high shear device such that the velocity of the reaction is increased by greater than a factor of about 5. In some embodiments, the velocity of the reaction is increased by at least a factor of 10. In some embodiments, the velocity is increased by a factor in the range of about 10 to about 100 fold.

In some embodiments, HSD 40 delivers at least 300 L/h at a tip speed of at least 4500 ft/min, and which may exceed 7900 ft/min (40 m/s). The power consumption may be about 1.5 kW. Although measurement of instantaneous temperature and pressure at the tip of a rotating shear unit or revolving element in HSD 40 is difficult, it is estimated that the localized temperature seen by the intimately mixed reactants is in excess of 500° C. and at pressures in excess of 500 kg/cm$^2$ under cavitation conditions. The high shear mixing results in dispersion of micron or submicron-sized hydrogen-containing gas bubbles in a continuous liquid phase comprising hydrocarbonaceous compounds to be hydrocracked. In some embodiments, the resultant dispersion has an average bubble size less than about 1.5 μm. Accordingly, the dispersion exiting HSD 40 via line 18 comprises micron and/or submicron-sized gas bubbles. In some embodiments, the resultant dispersion has an average bubble size less than 1 μm. In some embodiments, the mean bubble size is in the range of about 0.4 μm to about 1.5 μm. In some embodiments, the mean bubble size is less than about 400 nm, and may be about 100 nm in some cases. In many embodiments, the microbubble dispersion is able to remain dispersed at atmospheric pressure for at least 15 minutes.

Once dispersed, the resulting dispersion exits HSD 40 via line 18 and feeds into reactor 10, as illustrated in FIG. 1. Optionally, the dispersion may be further processed prior to entering reactor 10, if desired. In embodiments, reactor 10 is a fixed bed reactor comprising a fixed bed of catalyst.

In reactor 10, hydrocracking occurs via hydroconversion in the presence of hydrocracking catalyst as the dispersion from HSD 40 contacts catalyst. The contents of reactor 10 may be stirred continuously or semi-continuously, the temperature of the reactants may be controlled (e.g., using a heat exchanger), pressure in the vessel may be monitored using suitable pressure measurement instrumentation, and the fluid level inside reactor 10 may be regulated using standard techniques. Hydrocracked product may be produced either continuously, semi-continuously or batch wise, as desired for a particular application.

In embodiments, reactor 10 comprises a fixed bed of catalyst. In embodiments, reactor 10 comprises a trickle bed reactor. Hydrocracking catalyst may be introduced continuously or non-continuously into reactor 10 via an inlet line (not shown in FIG. 1), as a slurry or catalyst stream. Alternatively, or additionally, catalyst may be added elsewhere in system 100. For example, catalyst slurry may be injected into line 21, in some embodiments.

In embodiments, reactor 10 comprises a bed of suitable catalyst known to those of skill in the art to be suitable for hydrocracking as described hereinabove.

Reactor Conditions.

The temperature and pressure within reactor 10, which indicates process severity along with other reaction conditions, may vary depending on the feed, the type of catalyst employed, and the degree of hydroconversion sought in the process. In embodiments, a lower hydroconversion may be desirable, for example, to decrease hydrogen consumption. At low conversions, the n-paraffins in the feedstock may be converted in preference to the iso-paraffins but at higher conversions under more severe conditions iso-paraffins may also be converted.

The feedstock is contacted with the catalyst in the presence of hydrogen under hydrocracking conditions of elevated temperature and pressure. In embodiments, conditions of temperature, pressure, space velocity and hydrogen ratio which are similar to those used in conventional hydrocracking are employed.

In embodiments, hydrocracking in reactor 10 takes place at temperatures ranging from 100° C. to 400° C. and elevated pressures ranging from 101.325 kPa-13.2 MPa (1 atmospheres to 130 atmospheres) of absolute pressure. In embodiments, hydrocracker 10 is operated at a temperature in the range of 350° C. to 450° C. (650° F. to 850° F.). In embodiments, the pressure of reactor 10 is greater than about 7,000 kPa (1,000 psig). In embodiments, the pressure of reactor 10 is from about 5171 kPa (750 psig) to about 69 MPa (10,000 psig), or from 6.9 MPa (1,000 psig) to 27.5 MPa (4,000 psig). In embodiments, the hydrogen partial pressure in reactor 10 is from 600 kPa to 20,000 kPa. High hydrogen pressures may be desirable to prevent catalyst aging and so to maintain sufficient activity to permit the process to be operated with a fixed bed of catalyst for periods of one to two years without the need for regeneration. In some embodiments, the pressure in reactor 10 is in the range of from about 202.65 kPa (2 atm) to about 5.6 MPa-6.1 MPa (55-60 atm). In some embodiments, reaction pressure is in the range of from about 810.6 kPa to about 1.5 MPa (8 atm to about 15 atm).

The ratio of hydrogen to the hydrocarbon feedstock in the dispersion from HSD 40 may be from 0.009 $m^3$/L to 3.6 $m^3$/L (50 to 20,000 SCF/bbl). The space velocity of the feedstock may be from 0.1 to 20 LHSV, preferably 0.1 to 1.0 LHSV.

Hydrocracked product exits reactor 10 by way of line 16. In embodiments, product stream in line 16 comprises a two-phase mixture of liquid and gas. Hydrocracked product in line 16 comprises any unreacted hydrogen gas, unreacted higher molecular weight hydrocarbons, and lower boiling point hydrocarbons produced by hydrocracking of heavier hydrocarbons in the hydrocarbonaceous feedstream.

Downstream Processing.

The effluent from the hydrocracking reactor exits the hydrocracking zone via line 16. The effluent from reactor 10 comprises a two-phase mixture of liquid and gases. In embodiments, the principal components of the liquid phase of the effluent are C5 and higher hydrocarbons. Upon removal from the reactor 10, product stream in line 16 may be passed to a product upgrade system for further processing. Product upgrading may produce a wide range of commercial products, for example, gasoline, lube oil, and middle distillate fuels including diesel, naphtha, kerosene, jet fuel, and fuel oil.

Product stream in line 16 may be further treated as known to those of skill in the art. In embodiments, line 16 fluidly connects reactor 10 with a separator zone 30. Separator zone 30 may comprise, for example, a high pressure separator from which hydrogen and light gases are removed via line 24 and a separated product stream is extracted via line 36. Separator zone 30 may be fluidly connected to fractionator 50 via line 36. Fractionator 50 may be a fractional distillation column operating at lower pressure than separator 30. Converted (hydrocracked) product may be taken overhead from fractionator 50 via line 45. Heavy unconverted oil may be removed from the bottom of fractionator 50 via line 35. A portion of the bottoms stream from fractionator 50 comprising unconverted and heavy oil may be recycled via stream 20 to high shear device 40 for further conversion. Line 20 may be connected with line 21, for example, for recycle of unconverted hydrocarbonaceous product to HSD 40.

In embodiments, product stream in line 35 is further treated as known to those of skill in the art. For example, the product stream 35 may be subjected to dewaxing process.

Multiple Pass Operation.

In the embodiment shown in FIG. 1, the system is configured for single pass operation, wherein the output 16 from reactor 10 goes directly to further processing for recovery of hydrocracked product. In some embodiments it may be desirable to pass the contents of reactor 10, or a liquid fraction containing high boiling compounds, through HSD 40 during a subsequent pass. In this case, unconverted compounds may be introduced into HSD 40 by injection into line 21, line 13, or line 18, for example. In embodiments, line 16, line 36, line 20, or a combination thereof is connected to line 21, such that at least a portion of the contents of a downstream line comprising unconverted or heavy hydrocarbonaceous compounds is recycled to HSD 40. Recycle may be by way of pump 5 and line 13 and thence HSD 40. Additional hydrogen-containing gas may be injected via line 22 into line 13, or it may be added directly into the high shear device (not shown).

Multiple High Shear Mixing Devices.

In some embodiments, two or more high shear devices like HSD 40, or configured differently, are aligned in series, and are used to further enhance the reaction. Their operation may be in either batch or continuous mode. In some instances in which a single pass or "once through" process is desired, the use of multiple high shear devices in series may also be advantageous. For example, in embodiments, outlet dispersion in line 18 may be fed into a second high shear device. When multiple high shear devices 40 are operated in series, additional hydrogen gas may be injected into the inlet feedstream of each high shear device. In some embodiments, multiple high shear devices 40 are operated in parallel, and the outlet dispersions therefrom are introduced into one or more reactor 10.

The increased surface area of the micrometer sized and/or submicrometer sized hydrogen bubbles in the dispersion in line 18 produced within high shear device 40 results in faster and/or more complete hydrocracking in reactor 10. As mentioned hereinabove, additional benefits may be an ability to operate reactor 10 at lower temperatures and/or pressures resulting in operating and/or capital cost savings.

The benefits of the present invention include, but are not limited to, faster cycle times, increased throughput, more effective use of catalyst, higher degree of hydroconversion, reduced operating costs and/or reduced capital expense due to the possibility of designing smaller hydrocracking reactors, and/or operating the hydrocracking process at lower temperature and/or pressure.

The application of enhanced mixing of the reactants by HSD 40 potentially permits more effective hydrocracking of hydrocarbonaceous streams. In some embodiments, the enhanced mixing potentiates an increase in throughput of the process stream. In some embodiments, the high shear mixing device is incorporated into an established process, thereby enabling an increase in production (i.e., greater throughput). In contrast to some methods that attempt to increase the degree of hydrocracking by simply increasing hydrocracker temperature, catalyst acidity, or residence time, the superior dispersion and contact provided by external high shear mixing may allow in many cases a decrease in overall operating temperature, residence time, and/or catalyst acidity while maintaining or even increasing throughput.

Without wishing to be limited to a particular theory, it is believed that the level or degree of high shear contacting is sufficient to increase rates of mass transfer and also produces localized non-ideal conditions that enable reactions to occur that would not otherwise be expected to occur based on Gibbs free energy predictions. Localized non ideal conditions are believed to occur within the high shear device resulting in increased temperatures and pressures with the most significant increase believed to be in localized pressures. The increase in pressures and temperatures within the high shear device are instantaneous and localized and quickly revert back to bulk or average system conditions once exiting the high shear device. In some cases, the high shear mixing device induces cavitation of sufficient intensity to dissociate one or more of the reactants into free radicals, which may intensify a chemical reaction or allow a reaction to take place at less stringent conditions than might otherwise be required. Cavitation may also increase rates of transport processes by producing local turbulence and liquid micro-circulation (acoustic streaming). An overview of the application of cavitation phenomenon in chemical/physical processing applications is provided by Gogate et al., "Cavitation: A technology on the horizon," *Current Science* 91 (No. 1): 35-46 (2006). The high shear mixing device of certain embodiments of the present system and methods induces cavitation whereby hydrogen and hydrocarbonaceous compounds are dissociated into free radicals, which then react to produce lower boiling hydrocracked product compounds.

In some embodiments, the system and methods described herein permit design of a smaller and/or less capital intensive process than previously possible without the use of external high shear device 40. Potential advantages of certain embodiments of the disclosed methods are reduced operating costs and increased production from an existing process. Certain embodiments of the disclosed processes additionally offer the advantage of reduced capital costs for the design of new processes. In embodiments, dispersing hydrogen-containing gas in hydrocarbonaceous fluid comprising compounds to be hydrocracked with high shear device 40 decreases the amount of unreacted hydrogen (for example, hydrogen removed in line 24).

The present methods and systems for hydrocracking of hydrocarbonaceous fluids via hydrocracking employ an external high shear mechanical device to provide rapid contact and mixing of chemical ingredients in a controlled environment in the reactor/high shear disperser device. The high shear device reduces the mass transfer limitations on the reaction and thus increases the overall reaction rate, and may allow substantial hydrocracking under global operating conditions under which substantial reaction may not be expected to occur.

In embodiments, the process of the present disclosure provides for a higher selectivity to desirable hydrocarbons than conventional hydrocracking processes comprising an absence of external high shear mixing. In embodiments, the degree of mixing in external high shear device 40 is varied to attain a desired outlet product profile. In embodiments, the high shear hydrocracking process of the present disclosure allows the operation of hydrocracker 10 at a lower temperature whereby longer hydrocarbons are produced. In embodiments, the use of the present system and method for the hydrocracking of hydrocarbonaceous feedstock makes economically feasible the use of reduced amounts of hydrogen, by increasing the rate of cracking/hydrogenation (decreasing mass transfer resistance).

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, and so forth). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, and the like.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The disclosures of all patents, patent applications, and publications cited herein are hereby incorporated by reference, to the extent they provide exemplary, procedural or other details supplementary to those set forth herein.

What is claimed is:

1. A method for hydrocracking a feedstream comprising a liquid hydrocarbon, the method comprising:
   forming a dispersion comprising hydrogen-containing gas bubbles dispersed in the liquid hydrocarbon, wherein the hydrogen-containing gas bubbles have a mean diameter of less than about 5 µm, by introducing a mixture of the hydrogen-containing gas and the feedstream to an external high shear device comprising at least one toothed rotor and complementarily-shaped stator separated by a shear gap in the range of from about 0.025 mm to about 10.0 mm, wherein the shear gap is the minimum distance between the rotor and the stator, and wherein subjecting the mixture to shear initiates the formation of free radicals without the presence of a catalyst, wherein the high shear device comprises an enclosure whereby the temperature and pressure therein can be controlled, and wherein the at least one toothed rotor is rotated at a tip speed of at least 5.0 m/s during formation of the dispersion; and
   transferring the dispersion from the external high shear device to a fixed bed hydrocracking reactor in the presence of a hydrocracking catalyst, wherein at least a portion of the feedstream is converted into hydrocracked product.

2. The method of claim 1 wherein the catalyst is present as a bed of catalyst.

3. The method of claim 1 wherein the mean gas bubble diameter is less than 100 nm.

4. The method of claim 1 wherein the hydrocracking catalyst comprises zeolite, clay, alumina, silica, zirconia, magnesia, titania, or a combination thereof.

5. The method of claim 1 further comprising:
   transporting the mixture to the high shear device at a feed pressure in the range of about 14 psig to about 55 psig and a feed temperature in the range of about 400° F. to about 1100° F.;
   operating the hydrocracking reactor at a reactor pressure in the range of about 100 psig to about 10,000 psig and a reactor temperature in the range of about 250° F. to about 850° F.; and
   removing the hydrocracked product from the hydrocracking reactor and using a high pressure separator to remove excess hydrogen from the hydrocracked product.

6. The method of claim 5 further comprising recycling at least a portion of recovered hydrogen to the external high shear device.

7. The method of claim 5 further comprising, upon removal of hydrogen therefrom in the high pressure separator, fractionating the product whereby a bottoms product is obtained.

8. The method of claim 7 further comprising recycling at least a portion of the bottoms product to the external high shear device.

9. The method of claim 1, wherein forming the dispersion in the external high shear device comprises subjecting the mixture to a shear rate of greater than about 20,000 s$^{-1}$, and wherein the shear rate varies in the high shear device along a longitudinal flow path.

10. The method of claim 1, wherein the at least one toothed rotor comprises circumferentially spaced rotor teeth.

11. The method of claim 10 wherein the external high shear device produces a local pressure of at least about 1034.2 MPa (150,000 psi) at the tip of the at least one toothed rotor.

12. The method of claim 10 wherein the energy expenditure of the external high shear device is greater than 1000 W/m$^3$.

13. The method of claim 1 wherein the feedstream comprises at least one selected from residual oils, gas oils, and combinations thereof.

14. A method for hydrocracking, the method comprising:
   introducing a fluid mixture comprising hydrogen gas and liquid hydrocarbons to be hydrocracked to an external high shear device comprising at least one toothed rotor and complementarily-shaped stator separated by a shear gap in the range of from about 0.025 mm to about 10.0 mm, wherein the shear gap is the minimum distance between the rotor and the stator, and operating with a shear rate greater than 20,000 s$^{-1}$ to produce a dispersion comprising hydrogen gas bubbles in a continuous phase of the liquid hydrocarbons and initiate the formation of free radicals without the presence of a catalyst, wherein the hydrogen gas bubbles have a mean diameter of less than about 5 µm, wherein the external high shear device comprises enclosure whereby the temperature and pressure therein can be controlled, and at least one generator comprising the toothed rotor and a complementary-shaped stator; and
   introducing the dispersion into a fixed bed hydrocracking reactor, whereby a hydrocracked product is produced.

15. The method of claim 14 further comprising:
   separating, at a first pressure, the hydrocracked product into a gas stream and a separated liquid product stream comprising hydrocracked product;
   fractionally distilling the separated liquid product stream at a second pressure lower than the first pressure to separate lower boiling compounds in the separated liquid product stream from higher boiling compounds; and
   recycling at least a portion of the higher boiling compounds to the external high shear device.

16. The method of claim 14 further comprising:
   introducing the fluid mixture to the external high shear device at a feed pressure in the range of about 14 psig to about 55 psig and a feed temperature in the range of about 400° F. to about 1100° F.; and
   operating the hydrocracking reactor at a reactor pressure in the range of about 100 psig to about 10,000 psig and a reactor temperature in the range of about 250° F. to about 850° F., and wherein the average bubble diameter of the mechanically sheared hydrogen gas in the dispersion is less than about 100 nm.

17. The method of claim 14 wherein the dispersion is stable for at least about 15 minutes at atmospheric pressure.

18. The method of claim 14 wherein the external high shear device comprises at least two generators, wherein the shear rate in at least one generator is different from the shear rate in at least another generator.

19. The method of claim 1 further comprising:
   removing the hydrocracked product from the hydrocracking reactor;
   removing excess hydrogen from the hydrocracked product, thus providing a hydrogen-reduced hydrocracked product;
   fractionating the hydrogen-reduced hydrocracked product, thus providing a bottoms product and a fractionated hydrocracked product; and recycling a portion of the hydrocracked product from the hydrocracking reactor to the external high shear device, recycling a portion of the hydrogen-reduced hydrocracked product to the external high shear device, recycling a portion of the bottoms product to the external high shear device, or a combination thereof.

20. The method of claim 1 wherein the hydrogen-containing gas bubbles are nanobubbles.

21. The method of claim 14 wherein the hydrogen gas bubbles are nanobubbles.

* * * * *